United States Patent
Udagawa et al.

[11] Patent Number: 5,169,163
[45] Date of Patent: Dec. 8, 1992

[54] STEEL LAMINATE GASKET WITH MAIN AND AUXILIARY SEALING MEMBERS

[75] Inventors: Tsunekazu Udagawa, Ichikawa; Yoshio Miyaoh, Tokyo, both of Japan

[73] Assignee: Ishikawa Gasket Co., Ltd., Tokyo, Japan

[21] Appl. No.: 720,172

[22] Filed: Jun. 27, 1991

[30] Foreign Application Priority Data

Jul. 24, 1990 [JP] Japan ............... 2-77818[U]

[51] Int. Cl.⁵ ............................................. F16J 15/08
[52] U.S. Cl. .................. 277/235 B; 277/180; 277/231; 277/234; 277/236
[58] Field of Search .............. 277/235 B, 236, 233, 277/234, 235 R, 232, 231, 180

[56] References Cited

U.S. PATENT DOCUMENTS

| | | | |
|---|---|---|---|
| 4,369,980 | 1/1983 | Backlin | 277/235 B |
| 4,518,168 | 5/1985 | Belter | 277/235 B |
| 4,548,165 | 10/1985 | Vorobiev et al. | 277/235 B X |
| 4,662,643 | 5/1987 | Rosenquist | 277/235 B |
| 4,739,999 | 4/1988 | Ishii et al. | 277/235 B |
| 4,767,124 | 8/1988 | Udagawa | 277/235 B |
| 4,776,601 | 10/1988 | Yamada | 277/234 X |
| 4,834,399 | 5/1989 | Udagawa et al. | 277/235 B X |
| 4,861,046 | 8/1989 | Udagawa | 277/236 X |
| 4,898,396 | 2/1990 | Udagawa | 277/235 B |
| 4,998,741 | 3/1991 | Udagawa | 277/235 B |

FOREIGN PATENT DOCUMENTS

| | | | |
|---|---|---|---|
| 2602006 | 1/1988 | France | 277/235 B |
| 0196244 | 6/1981 | Japan | 277/235 B |
| 0010446 | 1/1982 | Japan | 277/235 B |
| 0101576 | 5/1988 | Japan | 277/235 B |
| 0240756 | 9/1989 | Japan | 277/235 R |

Primary Examiner—William A. Cuchlinski, Jr.
Assistant Examiner—James K. Folker
Attorney, Agent, or Firm—Kanesaka and Takeuchi

[57] ABSTRACT

The gasket of the invention is installed in an internal combustion engine having a hole to be sealed. The gasket is formed of first and second outer plates, and a middle member situated between the outer plates. A main sealing member formed of a wire ring is situated between a base portion of the first outer plate and the second outer plate around a curved portion of the first outer plate to define the hole of the engine. An auxiliary sealing member having a thickness less than that of the main sealing member is situated between the curved portion and the main sealing member. When the gasket is tightened, the main sealing member is compressed up to the thickness of the auxiliary sealing member to provide moderate surface pressure by the auxiliary sealing member near the hole and high surface pressure by the main sealing member away from the hole to be sealed. The surface pressure of sealing portions can be easily controlled.

12 Claims, 2 Drawing Sheets

STEEL LAMINATE GASKET WITH MAIN AND AUXILIARY SEALING MEMBERS

BACKGROUND OF THE INVENTION AND RELATED ART STATEMENT

The present invention relates to a steel laminate gasket having main and auxiliary sealing members for sealing around a hole by different surface pressures.

In an internal combustion engine, a gasket is installed between two engine members having a plurality of holes therein, wherein high pressure is formed in cylinder bores, while moderate pressure is formed in water holes. In order to seal around these holes with pressure therein, a gasket is formed to provide high surface pressure around the holes when the gasket is tightened.

In the gasket, however, if large surface pressure is formed around a hole to be sealed, a hole may be deformed by the large surface pressure. Also, in case a cylinder liner is installed in an engine, a large surface pressure is not generally applied onto the cylinder liner. Therefore, high surface pressure is not simply applied around the holes to be sealed.

When high surface pressure can not be applied around a hole, moderate surface pressure is applied around a hole to be sealed, and high surface pressure is further applied outside the portion where moderate surface pressure is applied. The area around the hole is sealed by the combination of the moderate and high surface pressures.

In U.S. Pat. No. 4,739,999, a gasket is provided with several beads, wherein two beads are vertically arranged to provide high surface pressures, and a bead is arranged laterally inside the two bead to provide moderate surface pressure.

In U.S. Pat. No. 4,861,046, two beads are arranged laterally away from each other around a hole to be sealed to provide different surface pressures.

The above prior patents operate as intended. However, when preparing a gasket with a plurality of holes to be sealed with different surface pressures, it is difficult to control surface pressures at portions around the different holes.

On the other hand, a wire ring has been used for sealing around a hole, such as shown in U.S. Pat. No. 4,809,653. The wire ring can be tightened as desired up to high tightening pressure, but since the wire ring can not provide resiliency, the use of the wire ring is limited.

Accordingly, one object of the present invention is to provide a steel laminate gasket having main and auxiliary sealing members, wherein surface pressures applied to the main and auxiliary sealing members can be controlled easily.

Another object of the invention is to provide a steel laminate gasket as stated above, wherein surface pressures around different holes to be sealed can be controlled easily.

A further object of the invention is to provide a steel laminate gasket as stated above, which can be manufactured easily and economically.

Further objects and advantages of the invention will be apparent from the following description of the invention.

SUMMARY OF THE INVENTION

In accordance with the present invention, a steel laminate gasket is installed in an internal combustion engine having at least one hole to be sealed. The gasket comprises first and second outer plates, and at least one middle member situated between the outer plates.

The first outer plate includes a curved portion to define a first hole located around a hole to be sealed, and a flange. The second outer plate includes a second hole and an inner portion around the second hole. The inner portion is disposed between the flange and a base portion of the first outer plate.

A main sealing member formed of a wire ring is situated between the first and second outer plates around the curved portion. Also, an auxiliary sealing member is installed between the main sealing member and the curved portion.

The auxiliary sealing member has a thickness less than a thickness of the main sealing member. Therefore, when the gasket is tightened, the main sealing member is compressed to the thickness of the auxiliary sealing member to thereby provide moderate surface pressure by the auxiliary sealing member near the hole to be sealed, and high surface pressure by the main sealing member outside the auxiliary sealing member.

In the present invention, since the wire ring is compressed to the height of the auxiliary sealing member, the distributing rate of surface pressures applied to the main and auxiliary sealing members can be controlled easily.

Although the main sealing member is made of the wire ring, the wire ring is compressed to the thickness of the auxiliary sealing member, so that the wire ring is not excessively compressed. A dent by the wire ring is not formed at the cylinder head or the cylinder block.

The gasket further includes at least one hole for fluid, and a fluid hole sealing member formed around the fluid hole. When the main sealing member is tightened, the fluid hole sealing member is also compressed to a predetermined height. Therefore, the surface pressure at the fluid hole sealing member can be easily controlled by tightening the gasket.

The auxiliary sealing member may have resiliency to provide surface pressure by resiliency thereof when the gasket is tightened. Alternatively, the auxiliary sealing member may be formed of a non-compressible member.

The auxiliary sealing member may be integrally formed with the second outer plate by turning or bending the same near the curved portion. Also, the auxiliary sealing member may be separately formed and situated between the main sealing member and the curved portion.

DETAILED DESCRIPTION OF PREFERRED EMBODIMENTS

Figure 1:
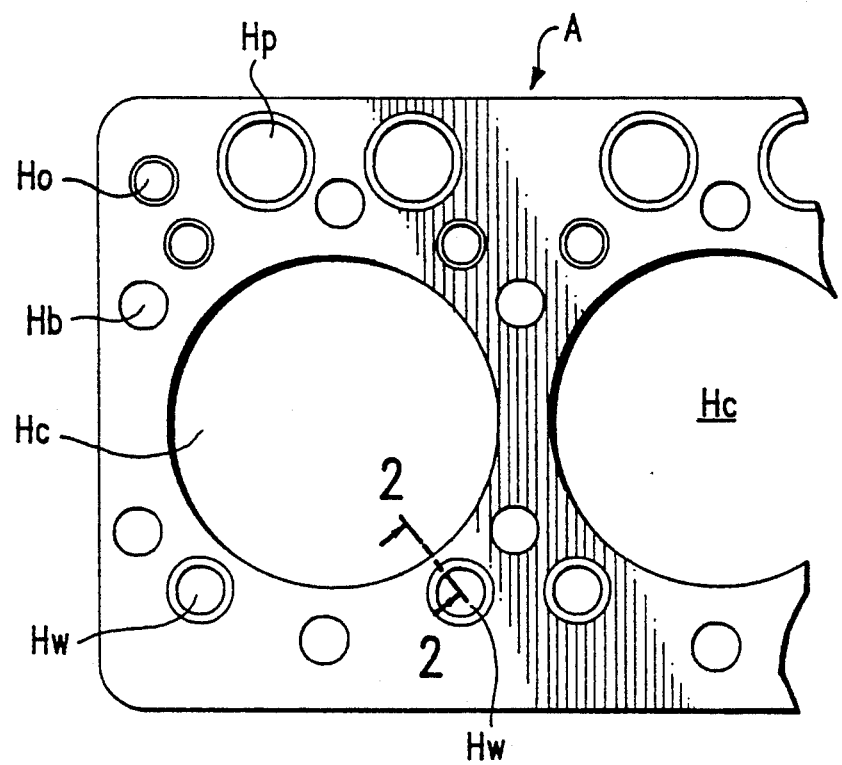
FIG. 1 is a partial plan view of a first embodiment of a steel laminate gasket of the invention.
Figure 2:
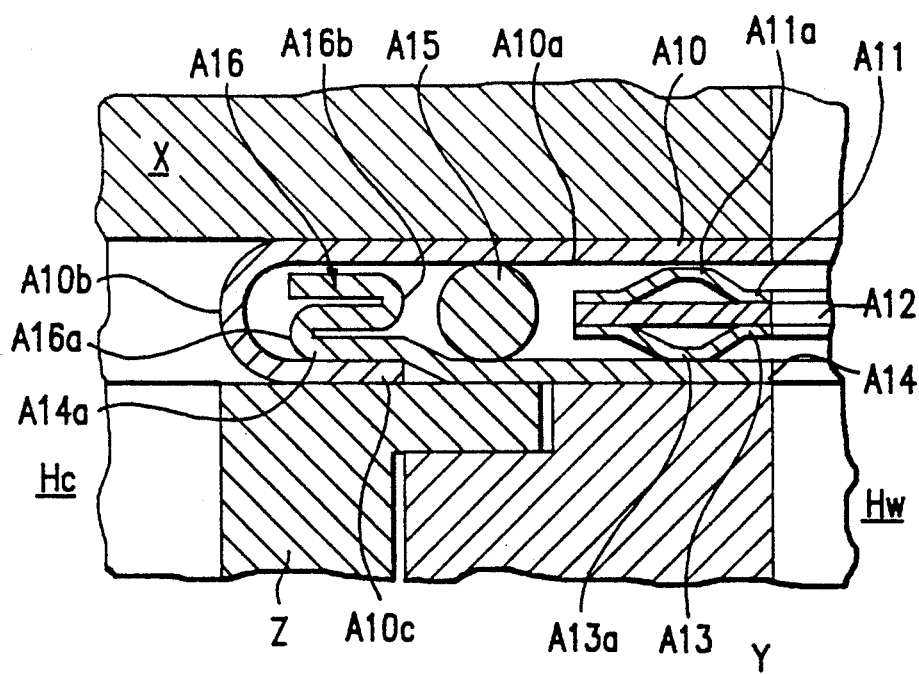
FIG. 2 is an enlarged section view taken along a line 2—2 in FIG. 1.

Referring to FIGS. 1 and 2, a first embodiment A of a steel laminate gasket of the invention is shown. The gasket A is a cylinder head gasket and is provided with a plurality of cylinder bores Hc, water holes Hw, oil holes Ho, push rod holes Hp, and bolt holes Hb, as in the conventional gasket.

As shown in FIG. 2, the gasket A is installed between a cylinder head X and a cylinder block Y with a cylinder liner Z. However, the gasket A of the invention may be installed in an engine without the cylinder liner Z.

The gasket A is formed of an upper plate A10, three middle plates A11, A12, A13, and a lower plate A14, laminated with each other. A wire ring A15 is installed between the upper and lower plates A10, A14 around the cylinder bore Hc.

The upper plate A10 is formed of a base portion A10a extending substantially throughout the entire area of the gasket, a curved portion A10b to define the cylinder bore Hc, and a flange A10c. Also, the base portion A10a includes a hole corresponding to the water hole Hw. The base portion A10a, curved portion A10b, and flange A10c are integrally formed together.

The middle plates A11, A13 are symmetrically arranged relative to the middle plate A12, and include beads A11a, a A13a around holes corresponding to the water hole Hw, respectively. The middle plate A12 has a hole corresponding to the water hole Hw, but does not have a bead around the water hole Hw.

The lower plate A14 extends parallel to the base portion of the upper plate A10. The lower plate A14 includes a hole larger than the cylinder bore Hc of the engine, an inner portion A14a situated between the flange A10c and the base portion A10a around the cylinder bore Hc, and a hole corresponding to the water hole Hw. The inner portion A14a is further provided with laminating portions A16 with curved portions A16a, A16b. The laminating portions A16 form an auxiliary sealing member around the cylinder bore Hc.

The wire ring A15 is a conventional wire ring, such as formed of low carbon steel wires, which is slightly compressed when tightened. The wire ring A15 is situated outside the laminating portions A16 around the cylinder bore Hc to operate as a main sealing member.

In the embodiment as shown in FIG. 2, the auxiliary sealing member or the laminating portions A16 is located above an inner portion of the cylinder liner Z, while the main sealing member or the wire ring A15 is located above an outer portion of the cylinder liner Z. Since the outer portion of the cylinder liner Z is disposed above the cylinder block Y, when high tightening pressure is applied to the wire ring A15, such high tightening pressure is transferred to the cylinder block Y. Therefore, the tightening pressure applied to the main sealing member does not affect the cylinder liner Z.

On the other hand, if large force is applied to the inner portion of the cylinder liner Z, the cylinder liner may deform. Therefore, large force is not applied to the inner portion of the cylinder liner Z.

For example, the gasket A is made of the following plates and wire ring;

| | |
|---|---|
| wire ring A15 | 1.2 mm (diameter) |
| upper plate A10 | 0.3 mm (thickness) |
| lower plate A14 | 0.25 mm (thickness) |
| middle plate A11 | 0.2 mm (thickness) |
| middle plate A13 | 0.2 mm (thickness) |
| middle plate A12 | 0.35 mm (thickness) |

The thicknesses at the main sealing member, the auxiliary sealing member and a portion outside the main sealing member relative to the cylinder bore are shown below, wherein the spaces are not considered at all;

| | |
|---|---|
| main sealing member | 1.75 mm |
| auxiliary sealing member | 1.35 mm |
| portion outside main sealing member | 1.30 mm |

When the gasket A is tightened, since the wire ring A15 is slightly compressible, the main sealing member or the wire ring A15 is compressed to the thickness of the auxiliary sealing member or laminating portions A16. Therefore, the wire ring A15 is compressed stronger than the laminating portions A16.

Accordingly, when the gasket is tightened, large surface pressure is not applied to the inner portion of the cylinder liner Z. Therefore, the cylinder liner Z is not damaged at all. Nevertheless, large surface pressure is formed at the wire ring A15 to seal around the cylinder bore Hc. Since the wire ring A15 is located above the cylinder block Y through the outer portion of the cylinder liner Z, large surface pressure is not applied to the inner portion of the cylinder liner Z. Therefore, the cylinder liner Z is not damaged at all.

When the gasket A is tightened, the portion outside the main sealing member is also tightened to the thickness of the auxiliary sealing member. Namely, the portion outside the main sealing member, i.e. the beads A11a, A13a, is not completely compressed. Therefore, creep relaxation of the beads A11a, A13a is prevented, and the beads A11a, A13a seal around the water hole HW resiliently.

In the present invention, the gasket A is tightened up to a thickness of the auxiliary sealing member. Therefore, the tightening pressure and surface pressure can be easily controlled. Also, the surface pressure around the water hole Hw is controlled as well.

Figure 3:
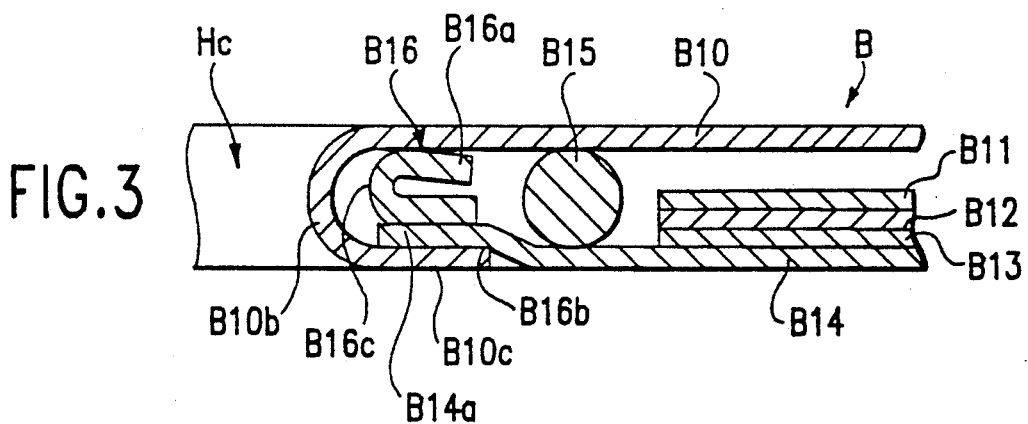
FIGS. 3-6 are section views, similar to FIG. 2, for showing second to fifth embodiments of a steel laminate gasket of the invention.

FIG. 3 shows a second embodiment B of a steel laminate gasket of the invention. The gasket B is formed of an upper plate B10 with a curved portion B10b and a flange B10c, three middle plates B11, B12, B13, a lower plate B14 with an inner portion B14a, and a wire ring B15, as in the gasket A (water hole is omitted in FIG. 3).

In the gasket B, an auxiliary sealing B16c is formed separately from the lower plate B14, and includes upper and lower portions B16a, B16b and a curved portion B16c. The auxiliary sealing member B16 is located above the inner portion B14a, and provides resiliency when the gasket B is tightened. Therefore, when the gasket B is tightened, the wire ring B15 provides strong surface pressure without resiliency, while the auxiliary sealing member B16 resiliently seals around the cylinder bore Hc.

Figure 4:
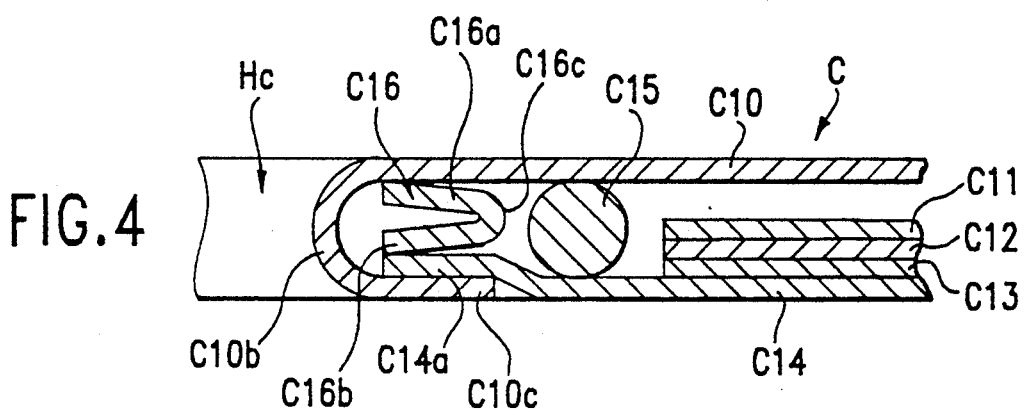

FIG. 4 shows a third embodiment C of a steel laminate gasket of the invention. The gasket C includes an upper plate C10 with a curved portion C10b and a flange C10c, three middle plates C11, C12, C13, a lower plate C14 with an inner portion C14a, a wire ring C15 and an auxiliary sealing member C16, as in the gasket B. The auxiliary sealing member C16 includes upper and lower portions C16a, C16b and a curved portion C16c.

In the gasket B, the curved portion B16c is located near the cylinder bore Hc, but in the gasket C, the curved portion C16c is located near the wire ring C15. In the gasket C, therefore, a surface pressure formed by the auxiliary sealing member C16 is created near the wire ring C15. The gasket C operates as in the gasket B.

Figure 5:
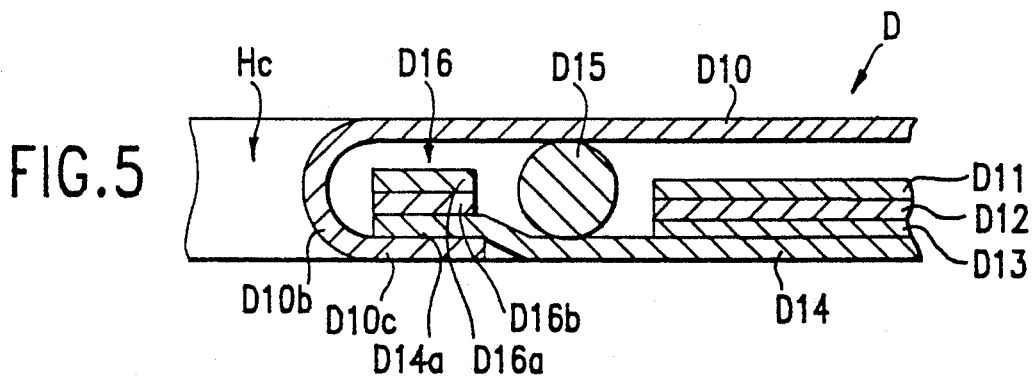

FIG. 5 shows a fourth embodiment D of a steel laminate gasket of the invention. The gasket D includes an upper plate D10 with a curved portion D10b and a flange D10c, middle plates D11, D12, D13, a lower plate D14 with an inner portion D14a, a wire ring D15 and an auxiliary sealing member D16, as in the gasket B.

In the gasket D, the auxiliary sealing member D16 is formed of two flat annular rings D16a, D16b, which are situated above the inner portion D14a of the lower plate D14. The auxiliary sealing member D16 is non-compressible. The gasket D operates as in the gasket A.

Figure 6:
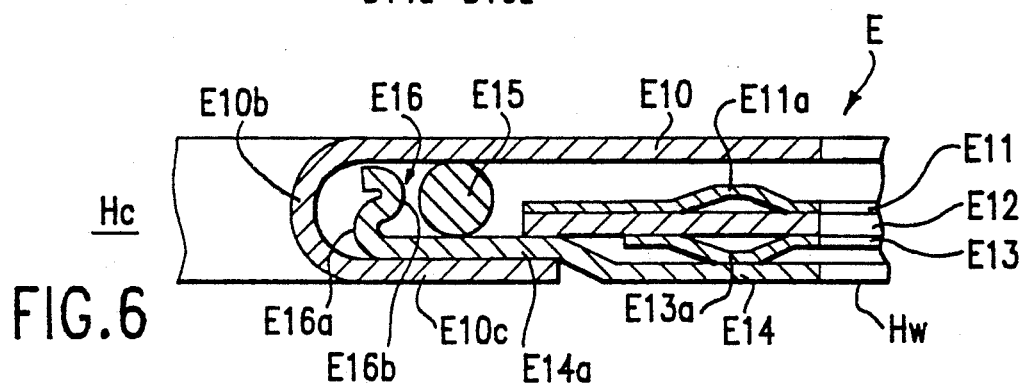

FIG. 6 shows a fifth embodiment E of a steel laminate gasket of the invention. The gasket E includes an upper plate E10 with a curved portion E10b and a flange E10c, middle plates E11, E13 with beads E11a, E13a, a middle plate E12, a lower plate E14 with an inner portion E14a, a wire ring E15 and an auxiliary sealing member E16, as in the gasket A.

In the gasket E, the auxiliary sealing member E16 is integrally formed with the lower plate E14 and is curved at curved portions E16a, E16b to thereby provide resiliency when the gasket E is tightened. Also, the wire ring E15 and edges of the middle plates E11, E12 are located above the inner portion E14a and the flange E10c, while the middle plate E13 is located outside the inner portion E14a and the flange E10c.

When the gasket E is tightened, the wire ring E15 is compressed up to the thickness (without space) of the auxiliary sealing member E16. The auxiliary sealing member E16 resiliently seals around the cylinder bore Hc, and the beads E11a, E13a seal around the water hole Hw.

In accordance with the present invention, a main sealing member or a wire ring and an auxiliary sealing member are formed around a hole to be sealed. When the gasket is tightened, the main sealing member is compressed up to the thickness of the auxiliary sealing member located near the hole to be sealed. Therefore, high surface pressure is formed away from the hole by the main sealing member, while moderate surface pressure is formed near the hole by the auxiliary sealing member. Also, since the wire ring is used, the surface pressure for other sealing mechanism can be controlled easily.

While the invention has been explained with reference to the specific embodiments of the invention, the explanation is illustrative and the invention is limited only by the appended claims.

What is claimed is:

1. A steel laminate gasket for an internal combustion engine having at least one hole to be sealed, comprising,
   a first outer plate having a base portion extending substantially throughout the entire area of the engine, a curved portion integrally formed with the base portion and extending substantially perpendicularly to the base portion to define a first hole corresponding to the hole of the engine to be sealed, and a flange integrally formed with the curved portion to extend away from the first hole,
   a second outer plate extending substantially parallel to the base portion of the first outer plate, said second outer plate having a second hole corresponding to the hole of the engine, and an inner portion around the second hole, said inner portion being situated between the base portion and the flange,
   a main sealing member formed of a wire ring situated between the base portion of the first outer plate and the second outer plate around the curved portion,
   an auxiliary sealing member situated between the main sealing member and the curved portion, said auxiliary sealing member having a non-compressible portion with a thickness less than a thickness of the main sealing member so that when the gasket is tightened, the main sealing member is compressed and deformed only to a thickness equal to the thickness of the non-compressible portion to thereby regulate surface pressures by the auxiliary sealing member and the main sealing member, said auxiliary sealing member providing moderate surface pressure near the hole to be sealed and the main sealing member providing high surface pressure outside the auxiliary sealing member, and
   at least one middle member situated between the first and second outer plates outside the main sealing member relative to the first hole.

2. A steel laminate gasket according to claim 1, further comprising at least one hole for fluid and a fluid hole sealing member formed around the fluid hole, said fluid hole sealing member, when the main sealing member is compressed, being compressed to a predetermined height so that surface pressure at the fluid hole sealing member can be easily controlled.

3. A steel laminate gasket according to claim 2, wherein said middle member has a thickness at most equal to the thickness of the auxiliary sealing member so that the fluid hole sealing member is compressed when the main sealing member is sufficiently compressed.

4. A steel laminate gasket according to claim 3, wherein said middle member is formed of a plurality of steel plates, and said fluid hole sealing member is a bead formed on at least one of the steel plates.

5. A steel laminate gasket according to claim 4, wherein said auxiliary sealing member has resiliency so that when the gasket is tightened, the auxiliary sealing member provides surface pressure by the resiliency.

6. A steel laminate gasket according to claim 5, wherein said auxiliary sealing member is integrally formed with the second outer plate, said inner portion of the second outer plate being piled by turning the second plate to thereby form the auxiliary sealing member.

7. A steel laminate gasket according to claim 5, wherein said auxiliary sealing member is a annular member formed of upper and lower portions, and a bent portion connecting between the upper and lower portions, said auxiliary sealing member being situated between the inner portion of the second outer plate and the base portion of the first outer plate.

8. A steel laminate gasket according to claim 2, wherein said auxiliary sealing member is formed of at least one non-compressible annular member situated between the inner portion of the second outer plate and the base portion of the first outer plate.

9. A steel laminate gasket for an internal combustion engine having at least one hole to be sealed, comprising,
   a fist outer plate having a base portion extending substantially throughout the entire area of the engine, a curved portion integrally formed with the base portion and extending substantially perpendicularly to the base portion to define a first hole corresponding to the hole to be sealed, and a flange integrally formed with the curved portion to extend away from the first hole,
   a second outer plate extending substantially parallel to the base portion of the first outer plate, said second outer plate having a second hole corresponding to the hole of the engine and an inner portion around the second hole, said inner portion being situated between the base portion and the flange, a main sealing member formed of a wire ring situated between the base portion of the first outer plate and the second outer plate to surround the hole of the engine, said wire ring being compressed up to a predetermined thickness without elasticity when the gasket is tightened, an auxiliary sealing member situated between the wire ring and the curved portion and having a non-compressible portion, said non-compressible portion having a non-compressible thickness less than a thickness of the wire ring so that when the gasket is tightened, the wire ring is compressed and deformed only to a thickness equal to said non-compressible thickness with the surface pressure formed on the wire ring being regulated by the non-compressible portion, and said auxiliary sealing member providing moderate surface pressure near the hole to be sealed and the wire ring providing high surface pressure outside the auxiliary sealing member to prevent deformation of the engine around the hole to be sealed; and at least one middle member situated between the first and second outer plates outside the main sealing member relative to the first hole.

10. A steel laminate gasket according to claim 9, wherein said engine includes a cylinder liner and a cylinder block, said auxiliary sealing member being situated on the cylinder liner and said wire ring being situated on the cylinder block through a part of the cylinder liner.

11. A steel laminate gasket according to claim 9, wherein said auxiliary sealing member has resiliency so that when the gasket is tightened, the auxiliary sealing member provides surface pressure by resiliency.

12. A steel laminate gasket according to claim 11, wherein said auxiliary sealing member is integrally formed with the second outer plate, said inner portion of the second outer plate being piled by turning the second plate to thereby form the auxiliary sealing member.

* * * * *

UNITED STATES PATENT AND TRADEMARK OFFICE
CERTIFICATE OF CORRECTION

PATENT NO. : 5,169,163

DATED : December 8, 1992

INVENTOR(S) : Tsunekazu Udagawa et al

It is certified that error appears in the above-identified patent and that said Letters Patent is hereby corrected as shown below:

Column 4, line 30, change "HW" to --Hw--.

Column 6, line 56, change "fist" to --first--.

Signed and Sealed this

Twelfth Day of October, 1993

Attest:

BRUCE LEHMAN

Attesting Officer     Commissioner of Patents and Trademarks